United States Patent [19]

Cathers

[11] 4,155,495
[45] May 22, 1979

[54] GLASS CUTTER WITH CONVEYOR FOR SEPARATING AND ALIGNING GLASS SHEETS

[75] Inventor: William P. Cathers, Allison Park, Pa.

[73] Assignee: PPG Industries, Inc., Pittsburgh, Pa.

[21] Appl. No.: 888,894

[22] Filed: Mar. 22, 1978

Related U.S. Application Data

[62] Division of Ser. No. 784,485, Apr. 4, 1977, Pat. No. 4,111,412.

[51] Int. Cl.² ............................................. B26F 3/00
[52] U.S. Cl. ................................... 225/96.5; 83/110; 83/732; 198/461
[58] Field of Search .............. 271/251; 198/456, 459, 198/461, 782, 784, 792; 83/110, 418-421, 732; 225/2, 96.5

[56] References Cited

U.S. PATENT DOCUMENTS

| 268,629 | 12/1882 | Curtis | 198/784 |
|---|---|---|---|
| 1,228,543 | 6/1917 | Edwards | 83/419 |
| 1,447,649 | 3/1923 | Deputy | 198/784 |
| 1,626,352 | 4/1927 | Olson | 271/251 |
| 1,761,199 | 6/1930 | Drake | 198/784 X |
| 1,812,976 | 7/1931 | Nistle | 198/786 X |
| 1,833,965 | 12/1931 | Feller | 198/784 |
| 1,848,114 | 3/1932 | Drake | 198/784 |
| 1,848,162 | 3/1932 | Cone | 198/784 |
| 1,878,720 | 9/1932 | Von Reis | 198/784 |
| 1,898,005 | 2/1933 | Diescher | 198/786 X |
| 1,950,729 | 3/1934 | Johnson | 83/418 |
| 2,765,065 | 10/1956 | Leibelt | 198/761 |
| 3,011,211 | 12/1961 | Barns | 264/210 R |
| 3,183,747 | 5/1965 | Insolio | 83/419 X |
| 3,458,026 | 7/1969 | Lauzon et al. | 198/460 |
| 3,880,036 | 4/1975 | Yokoyama | 83/421 |

FOREIGN PATENT DOCUMENTS

| 2504350 | 10/1975 | Fed. Rep. of Germany | 271/251 |
|---|---|---|---|
| 396500 | 8/1933 | United Kingdom | 271/251 |

Primary Examiner—J. M. Meister
Attorney, Agent, or Firm—Donald Carl Lepiane

[57] ABSTRACT

A conveyor for separating and aligning glass sheets moving along a sheet movement path includes a plurality of cylindrical rolls skewed relative to the movement path to displace the advancing sheets toward a side of the conveyor. At the side of the conveyor the sheets are aligned by an endless belt rotating through a path parallel to the sheet movement path. Each successive roll in the direction of sheet advancement has increasing peripheral surface rotational speed to separate the advancing sheets.

8 Claims, 7 Drawing Figures

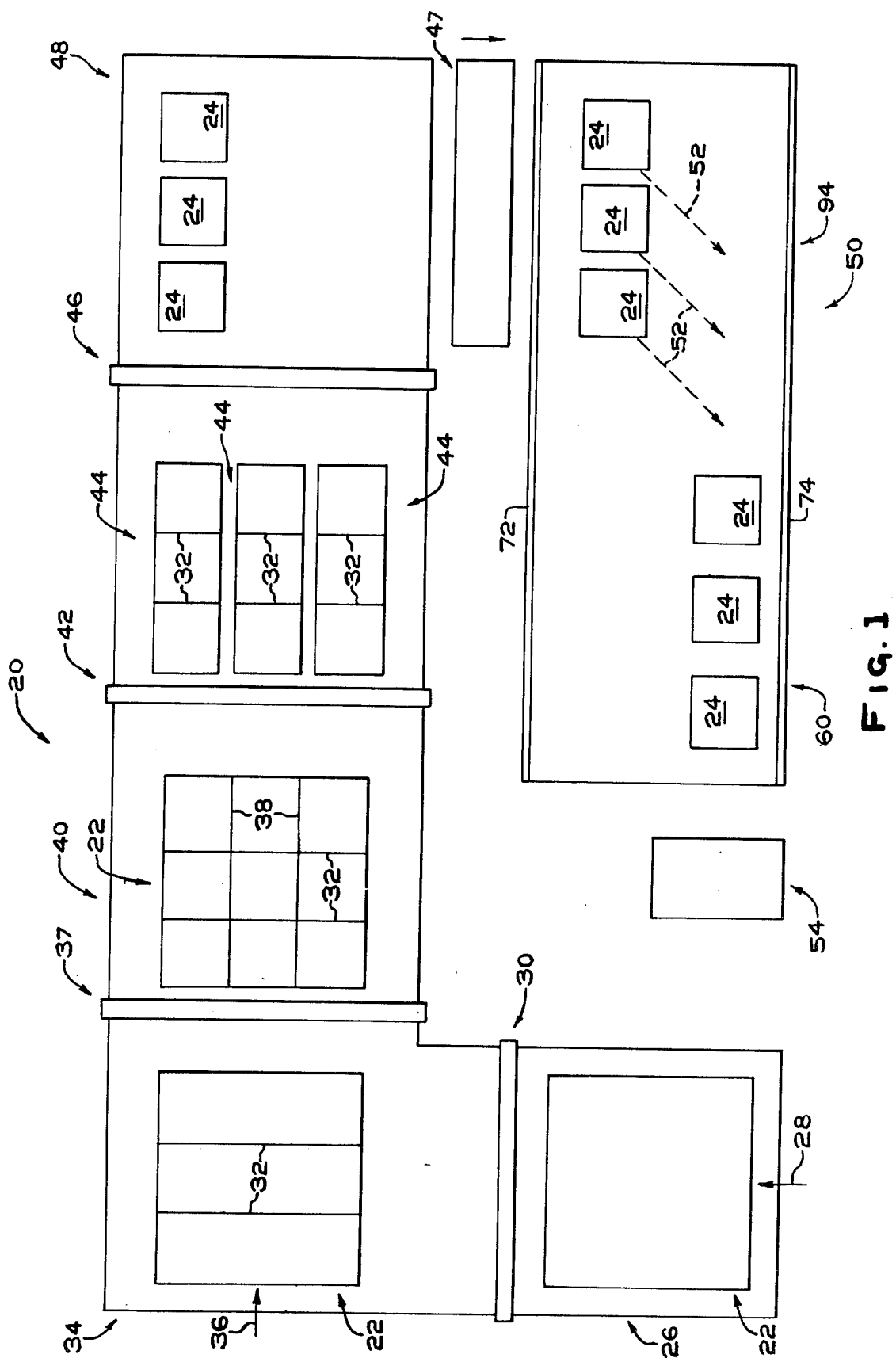

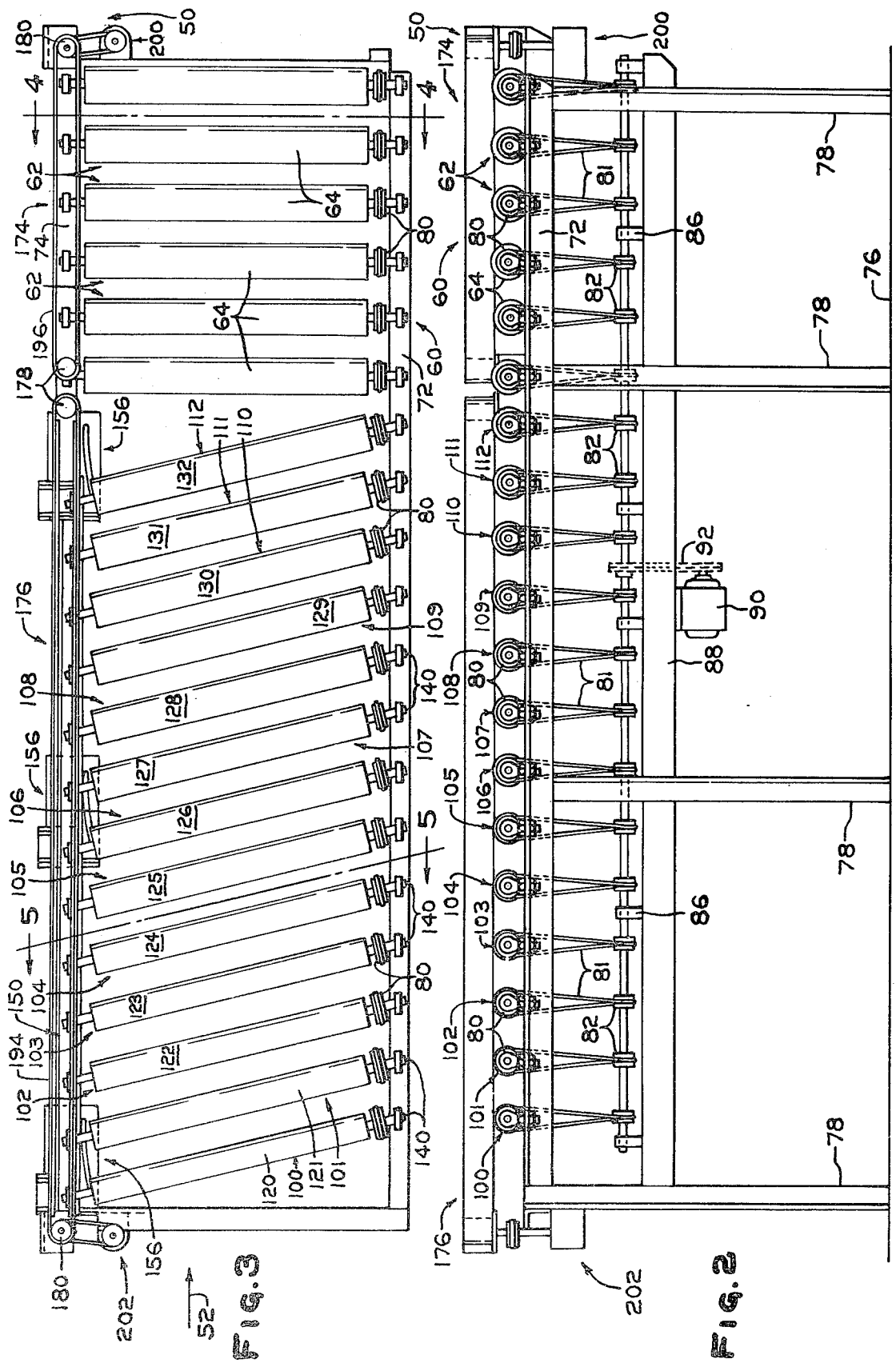

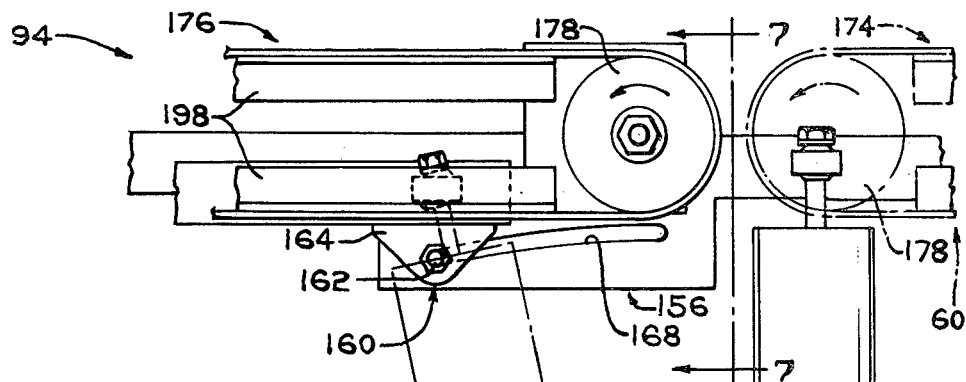
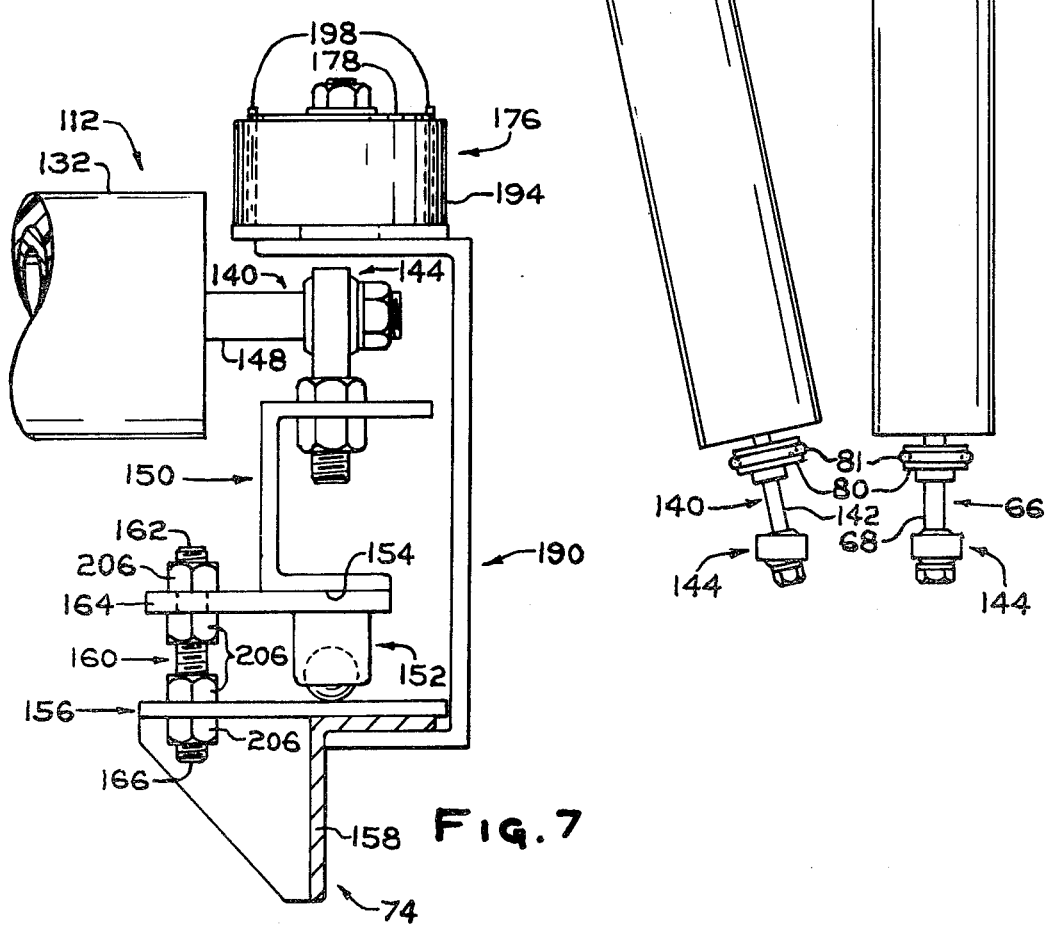

GLASS CUTTER WITH CONVEYOR FOR SEPARATING AND ALIGNING GLASS SHEETS

This is a division of application Ser. No. 784,485 filed Apr. 4, 1977 now U.S. Pat. No. 4,111,412.

BACKGROUND OF THE INVENTION

1. Field of the Invention

This invention relates to a conveyor for separating and aligning glass sheets as they advance along a sheet movement path.

2. Discussion of the Prior Art and Technical Problems

In the use of automatic equipment for removing glass sheets from a conveyor, the glass sheets are preferably aligned with unloading equipment and separated from one another. The glass sheets are aligned with the loading equipment so that the sheets move into the same predetermined unloading position. The glass sheets are separated to eliminate glass edge damage due to edge contact.

U.S. Pat. Nos. 1,228,543 and 1,833,965 each, in general, teach the use of skew rolls for advancing bar stock from one side of a conveyor to an opposite side of the conveyor. The bar stock drops from the conveyor onto a second conveyor and are displaced into a shearing machine.

Although the use of skew rolls as taught in the above-mentioned U.S. Patents are suitable for bar stock movement, there are limitations when practiced on glass sheets. For example, advancing glass sheets to a side of a conveyor and thereafter dropping them onto a second conveyor can damage the glass sheets.

In the sheet moving art, conveyors having skew rolls and a bar mounted at one side of the conveyor are known. The sheet is moved by the rolls into engagement with the bar to prevent the sheets from dropping from the conveyor.

These types of conveyors have limitations especially when used for glass sheets. For example, as the sheets engage the bar and are continually advanced by the conveyor, the friction between the side of the sheets and the bar can cause a sheet to rotate. This sheet rotation can cause edge contact between adjacent sheets resulting in edge damage.

U.S. Pat. Nos. 268,629; 1,447,649; 1,812,876 and 3,011,211 each teach, in general, the use of conveyor rolls having a constant shaft rotational speed and different diameters to provide each of the rolls with a different surface rotational or peripheral speed for accelerating or decelerating articles, e.g., glass sheets. Although each of the patents are suitable for their stated purposes, there is no teaching of a conveyor for separating and aligning sheets as they advance along a sheet movement path.

U.S. Pat. Nos. 1,761,199; 1,848,114; 1,879,720; 2,765,065 and 3,456,026 teach, in general, the use of conveyors for advancing different types of material, e.g., glass sheets, dough or boxes. Each of the conveyors teach in one form or another accelerating the material along the conveyor by having different rotational speeds acting on each of the rolls or by changing the rotational speed of the rolls.

There is no teaching in any of the above-identified patents for advancing glass sheets along a conveyor while aligning and separating the glass sheets.

In packing glass sheets, it is preferred to align the sheets and pull a gap between the sheets to prevent edge chipping. There are no apparatuses taught in the prior art that can perform both these functions and therefore it would be advantageous to provide such a conveying system.

SUMMARY OF THE INVENTION

This invention relates to a conveying system for aligning sheets, e.g., glass sheets, as they move along a sheet movement path. A plurality of circular conveying members are rotatably mounted in spaced relation to one another on a superstructure such that their axial centers are parallel to one another and subtend an oblique angle with a line normal and transverse to the sheet movement path. An endless belt is mounted adjacent a side of the superstructure and has a circular path parallel to the sheet movement path.

Further, this invention relates to an improved apparatus for cutting a piece of glass into glass sheets. The apparatus is of the type having first facilities for conveying the glass piece past glass scoring facilities to score the piece; second facilities for conveying the scored piece past facilities for opening the score in the scored piece to provide glass sheets; and third facilities for conveying the glass sheets along a sheet movement path into an unloading station. The improved apparatus includes the third conveying facilities having a first plurality of spaced circular conveying members rotating at the same axial speed. The conveying members each have a different diameter such that the conveying members each have a different peripheral rotational speed to alter the spacing between the sheets as they move along the sheet movement path.

Still further, this invention relates to a method of altering the distance between sheets as they move along a sheet movement path. A plurality of spaced cylindrical rolls each having a different diameter are provided to define the sheet movement path. The center axis of each roll is rotated at the same rotational speed while a plurality of sheets are advanced on the rolls to alter the distance between adjacent sheets as they move along the sheet movement path.

Also, this invention relates to a method of aligning sheets. The sheets are advanced along a sheet movement path and displaced toward one side of the movement path into engagement with an endless belt to align the sheets as they advance along the movement path.

BRIEF DESCRIPTION OF THE DRAWINGS

FIG. 1 is a plan view of a system incorporating features of the invention for cutting a glass piece into sheets and for separating and aligning the sheets;

FIG. 2 is a side view of a conveyor used in the system shown in FIG. 1, the conveyor incorporating features of the invention for aligning and separating the sheets.

FIG. 3 is a plan view of the conveyor shown in FIG. 1;

FIG. 6 is a partial view of the conveyor shown in FIG. 3 having portions removed for purposes of clarity to illustrate arrangement for angling the conveyor rolls with respect to the sheet movement path; and FIG. 7 is a view taken along lines 7—7 of FIG. 6.

DESCRIPTION OF THE INVENTION

Figure 4:
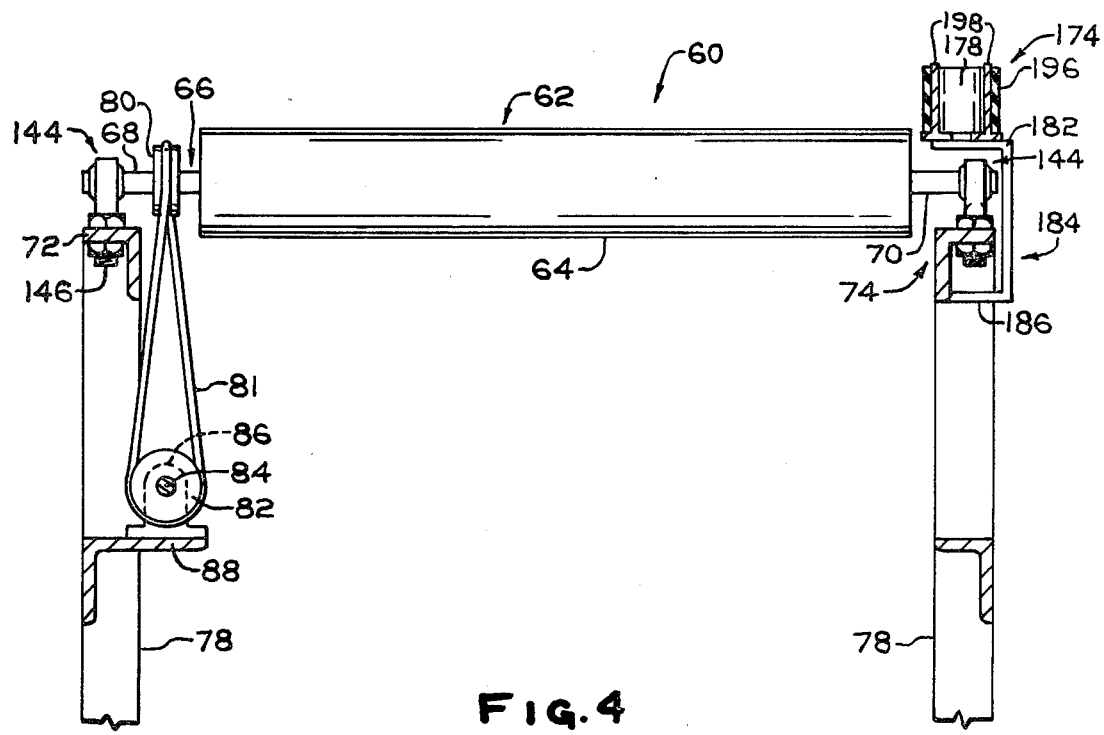
FIG. 4 is a view taken along lines 4—4 of FIG. 3.

Shown in FIG. 1 is a system 20 incorporating features of the invention for (1) cutting a piece of glass 22 into glass sheets 24, (2) separating and aligning the glass sheets 24 and (3) stacking the glass sheets 24.

In general, the glass piece 22 is advanced by conveyor 26 in direction of arrow 28 past a scoring bridge 30 to impose lateral scores 32 in the glass piece. The scored glass piece moves into a corner table 34 and is advanced in the direction of arrow 36 past a second scoring bridge 37 to impose longitudinal scores 38 in the glass piece 22.

Conveyor 40 advances the scored glass piece 22 through a longitudinal score opening station 42. At the score opening station 42, the longitudinal scores 38 are opened to provide glass sections 44. The glass sections 44 are advanced by the conveyor 40 into a lateral score opening station 46 to open the lateral scores 32 to provide the glass sheets 24.

Transfer device 47 tranfers the glass sheets 24, e.g., three glass sheets from the lateral score opening station 46 to aligning and separating conveyor 50 incorporating features of the invention. The glass sheets 24 as they advance in the direction of arrow 52 are separated and aligned in a manner to be discussed below.

The separated and aligned sheets 24 are removed from the conveyor 50 and stacked by unloading device 54.

The conveyors 26 and 40; scoring bridges 30 and 37; corner table 34; score opening stations 42 and 46; transfer device 47 and unloading device 54 are presented to illustrate the environment in which the invention may be practiced and any of the types known in the art may be used in the practice of the invention.

For example, the scoring bridges 30 and 37 may be of the type taught in U.S. Pat. Application Ser. No. 725,222 filed on Sept. 22, 1976 in the name of R. P. DeTorre for "Self-Aligning Apparatus for Scoring Fracturable Material". The longitudinal score opening station 42 may be of the type taught in U.S. Pat. Application Ser. No. 690,337 filed on May 26, 1976 in the name of R. P. DeTorre for "Method of and Apparatus for Opening Score Lines in Glass Sheets". The lateral score opening station 46 may be of the type taught in U.S. Pat. Application Ser. No. 736,963 filed on Oct. 29, 1976 in the name of R. P. DeTorre for "Apparatus for Opening Lateral Scores in Moving Glass Sheets".

The teachings of the above-identified applications are hereby incorporated by reference.

Referring now to FIGS. 2 and 3, the discussion will be directed to the aligning and separating conveyor 50 incorporating features of the invention. In the following discussion, like numerals refer to like elements.

Conveyor section 60 of the conveyor 50 includes a plurality of cylindrical rolls 62. The rolls 62 are identical in construction and as shown in FIG. 4, each include a cylindrical body or sleeve 64 preferably made of a resilient material mounted on a shaft 66. Ends 68 and 70 of the shafts 66 are rotatably mounted in any conventional manner on longitudinal structural members 72 and 74, respectively. The structural members 72 and 74 are supported above the floor 76 by vertical structural legs 78 (shown in FIG. 2).

With reference to FIG. 4, a pulley 80 is mounted adjacent the shaft end 68 of each roll 62 and operatively connected by belt 81 to a pulley 82 mounted on drive shaft 84. Shown in FIG. 2, the drive shaft 84 is rotatably mounted in bearing blocks 86 mounted on longitudinal support member 88 secured to the vertical legs 78. Motor 90 mounted on the support member 88 powers the drive shaft 84 by way of belt 92.

With reference to FIG. 3, conveyor section 94 of the conveyor 50 includes cylindrical rolls 100-112. Each of the rolls 100-112 include a cylindrical body or sleeve 120-132 respectively mounted on shaft 140. Preferably the cylindrical body 120-132 of the rolls 100-112, respectively, is made of a resilient material to prevent marring of the glass sheets 24.

The diameter of each successive cylindrical body 120-132 of the rolls 100-112, respectively, increases in the direction of the sheet movement path designated by the arrow 52 to accelerate the glass sheets 24 to pull a gap between the glass sheets. For example, the diameter of the cylindrical body 132 of the roll 112 is greater than the diameter of the cylindrical body 131 of the roll 111 which is greater than the diameter of the cylindrical body 130 of the roll 110 etc. With this arrangement the shaft 140 of each roll 100-112 can be rotated at the same rotational speed while the surface rotational speed or peripheral speed of the cylindrical body is at a different speed depending on its diameter. For example, for a given rotational shaft speed, increasing the diameter of the cylindrical body increases the surface rotational speed of the cylindrical body and vice versa.

Figure 5:
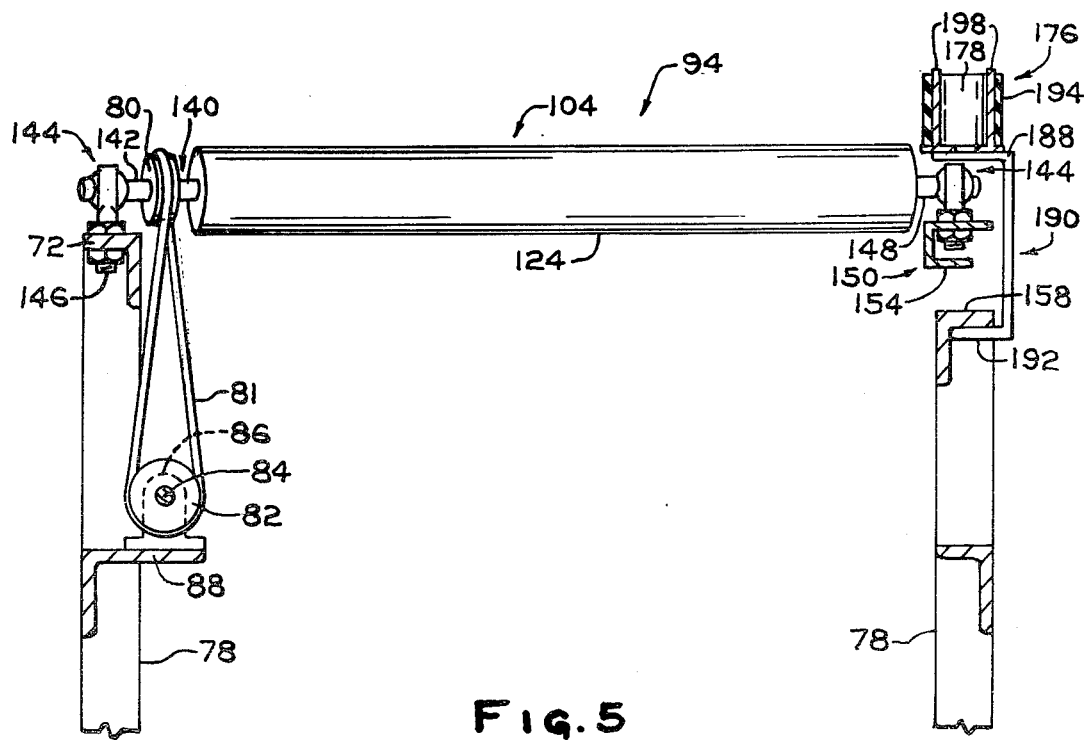
FIG. 5 is a view taken along lines 5—5 of FIG. 3.

With reference to FIG. 5, end 142 of each shaft 140 is rotatably mounted on the structural member 72 in any conventional manner. For example, the end 142 of the shaft 140 may be mounted in a rod end spherical bearing 144 with threaded end 146 of the bearing 144 secured to the structural member 72. End 148 of the shafts 140 are similarly mounted to a slideable member 150 to be discussed in more detail below.

The bearings 144 supporting the ends 142 aand 148 of the shaft 140 are preferably adjusted such that the cylindrical body of the rolls 100-122 are tangent to the horizontal plane of the sheet movement path. The shaft 140 of the rolls 100-112 are powered by the drive shaft 84 through a pulley 82 mounted on the dirve shaft 84, belt 81 and pulley 80 mounted on the end 142 of the shaft 140 of each roll 100-112.

With reference to FIG. 7, the elongated, slideable member 150 has a plurality of spaced ball guides 152 on bottom surface 154. Each of the ball guides 152 rides on a plate 156 mounted on stepped down portion 158 of the structural member 74 (see FIG. 6).

A threaded shaft 160 has end 162 secured to a plate 164 mounted to the support member 150 and the other end 166 passing through arcuate slot 168 formed in the plate 156.

Displacing the slideable member 150 to the left as viewed in FIG. 3 skews the rolls 100-112 with respect to the sheet movement path. In other words, the axial center of the cylindrical rolls 100-112 are traversed to the sheet movement path and subtend an oblique angle to a line transverse and normal to the sheet movement path.

Skewing the rolls advances the glass sheets while displacing the sheets toward a side of the conveyor, i.e., to the left as viewed in FIG. 5. The rate of side displacement of the sheets is a function of the angle of skew and the surface rotational speed of the rollers. Increasing the surface rotational speed of the rolls while maintaining the angle of skew constant increases the speed of side displacement of the sheet and vice versa. Increasing the angle of skew while maintaining the surface rotational speed of the rolls constant increases the speed of the side displacement and vice versa.

An endless belt conveyor 174 is mounted adjacent shaft end 70 of the rolls 62 and an endless belt 176 is mounted adjacent shaft end 148 of the rolls 100–112. Each of the belt conveyors 174 and 176 are identical in construction and include an idler spool 178 and a driven spool 180.

With reference to FIG. 4, the idler spool 178 is rotatably mounted on leg 182 of C channel 184. The other leg 186 of channel 184 is secured to the longitudinal member 74 adjacent the extreme left roll 62 as viewed in FIG. 3. The driven spool 180 of the belt conveyor 174 is similarly mounted on the longitudinal member 74 adjacent the extreme right roll 62 as viewed in FIG. 3.

With reference to FIG. 5, the spools 178 and 180 of the belt conveyor 176 are each rotatably mounted on leg 188 of a C channel 190. The other leg 192 of the C channel 190 is mounted on step down section 158 of the structural member 74. The idler spool 178 of the belt conveyor 176 is mounted adjacent the idler spool 178 of the belt conveyor 174 as shown in FIGS. 2 and 3. The driven spool 180 is mounted upstream, i.e., to the left as viewed in FIG. 3 of the roll 100.

The spools 178 and 180 of the belt conveyor 176 define the course of endless belt 194 and the spools 178 and 180 of the belt conveyor 174 define the course for the endless belt 196.

A pair of L-shaped belt guides 198 are mounted to the C channels 184 of the belt conveyor 174 and C channels 190 of the belt conveyor 176 to support the belts 194 and 196 against lateral displacement.

With specific reference to FIG. 3, the spool 180 of the belt conveyor is driven by motor 200 in any conventional manner to preferably rotate the belt 196 at the same rotational speed as the peripheral speed of the rolls 62. The spool 180 of the belt conveyor 176 is driven by motor 202 in any conventional manner.

The rotational speed of the belt 194 of the belt conveyor 176 is preferably selected to correspond to the peripheral rotational speed of the center roll, e.g., the roll 106. As was discussed above, the surface rotational speed of the rolls 100–112 varies depending on the diameter of the roll. By rotating the belt 194 at a rotational speed corresponding to the peripheral speed of the roll 106, excessive acceleration or deceleration of the sheets is minimized when the sheets engage the belt 194.

With reference to FIG. 1, the sheets 24 are positioned on the rolls of the conveyor section 94 by the transfer device 47. As the sheets 24 advance along the conveyor section 94 of the conveyor 50, they are separated from one another and displaced toward the belt 194 of the belt conveyor 176 (see FIG. 3) to align the sheets. The sheets are continually separated and held in alignment as they move onto the conveyor section 60 of the conveyor 50.

The conveyor section 60 moves the sheets downstream along the sheet movement path into an unload position. At the unload position, the sheets are removed from the conveyor 50 and stacked by the unloading device 54 (see FIG. 1).

Although the invention was discussed using one endless belt conveyor 176, the invention is not limited thereto. For example, the invention may be practiced using two or more endless belt conveyors adjacent the rolls 100–112 to futher increase acceleration of the sheets.

As can now be appreciated, the invention may be practiced on any type of sheet materials, e.g., wood or plastic and on articles other than sheets, e.g., boxes.

DETAILED DESCRIPTION OF THE INVENTION

The invention is practiced to separate and align 3 square glass sheets 24 having side dimensions of about 1 foot (0.3 meter) and a thickness of about 0.090 inch (0.023 centimeter). The glass sheets 24 are cut in any conventional manner from a square piece of glass 22 having side dimensions of about 3 feet (0.9 meter).

With reference to FIGS. 2 and 3, aligning and separating conveyor 50 includes a conveying section 94 having cylindrical rolls 100–112 and a conveying section 60 having a plurality of cylindrical rolls 62.

The cylindrical rolls 100–112 of the conveyor section 94 each include a cylindrical rubber body 120–132 respectively mounted on a steel shaft 140. As shown in FIG. 6, the shaft 140 has a length of about 38 inches (0.96 meter) and includes a central portion 204 having a length of about 30 inches (0.75 meter) and a diameter of about 2.375 inches (6.02 centimeters). Shaft ends 142 and 148 (shown in FIG. 5) each have a length of about 4 inches (10.16 centimeters) and a diameter of about 1 inch (2.54 centimeters).

Each of the cylindrical body 120–132 of the rolls 100–112, respectively, have a length of about 30 inches (0.75 meter). The outside diameter of the cylindrical body 120 of the roll 100 is about 3-3/16 inches (8.10 centimeters) and the outside diameter of each succeeding cylindrical body is about 1/16 inch (0.15 centimeter) greater than the preceding roll. For example, the cylindrical body 121 of the roll 101 has an outside diameter of about 3.25 inches (8.26 centimeters); the cylindrical body 123 of the roll 103 has an outside diameter of about 3-5/16 inches (8.41 centimeters); the cylindrical body 124 of the roll 104 has an outside diameter of about $3\frac{3}{8}$ inches (8.56 centimeters) and so on with the cylindrical body 132 of the roll 112 having an outside diameter of about 3-15/16 inches (10 centimeters).

With continued reference to FIGS. 2 and 3, the conveyor section 60 includes a plurality of cylindrical rolls 62 each having a rubber cylindrical body 28 having a length of about 30 inches (0.75 meter) and an outside diameter of about 4 inches (10.16 centimeters) mounted on a steel shaft 66 (see FIG. 4). The shaft 66 is similar in dimensions to the shaft 140 of the cylindrical rolls 100–112.

With reference to FIGS. 3–5, ends 68 of the shafts 66 of rolls 62 and ends 142 of the shafts 140 of the rolls 100–112 are rotatably mounted in a rod end spherical bearing 144 of the type sold by Heim Universal Corp. Cat. No. HMX10G. The rod end spherical bearings 144 are mounted on structural member 72 with the rolls 62 and 100–112 on a center to center spacing of about 6 inches (0.15 meter).

The end 70 of the shafts 66 of the rolls 62 are mounted in a similar manner to opposite structural member 74.

The end 148 of the shaft 140 of the rolls 100–112 are each rotatably mounted in rod end spherical bearings 144 mounted on slideable steel member 150 on a center to center spacing of about 6 inches (0.15 meter).

With reference to FIG. 7, the slideable member 150 has a length of about 100 inches (2.5 meters) and has 3 ball guides 152 on a center to center spacing of about 50 inches (1.25 meters) mounted on bottom surface 154 of the slideable member 150. The ball guides ride on a steel plate 156 mounted on step down portion 158 of the structural member 74. The plates 156 are each about 12 inches (0.3 meter) in length, 6 inches (0.15 meter) in width and ¼ inch (0.63 centimeter) thick.

A threaded shaft 160 has one end 162 secured to steel plate 164 mounted on bottom surface 154 of the slideable member adjacent to a ball guide 152 as shown in FIG. 7. The other end 166 of the threaded shaft 160 passes through an arcuate slot 168 formed in the end plate 156. The plate 168 has a radius of about 2.75 feet (0.85 meter).

The structural members 72, 74 and slideable member 150 are sized and the rod end spherical bearing 144 adjusted such that the cylindrical bodies 120–132 of the rolls 100–112, respectively, and cylindrical bodies 64 of the rolls 62 are tangent to horizontal plane of the sheet movement path.

The slideable member 150 is moved to the left as viewed in FIG. 3 to move the shaft end 148 of each roll 100–112 upstream of the sheet movement path to angle the rolls 120. In other words, the angle subtended by the center of the shaft 140 of the rolls 100–112 and a line normal and transverse to the article movement path is 12°. The slideable member 150 is secured in position by nuts 206 mounted on end of the threaded shaft 160 as shown in FIG. 7.

A pulley 80 is mounted adjacent shaft end 142 of each roll 100–112 and shaft end 68 of each roll 62. Each pulley 80 is connected to a pulley 82 mounted on drive shaft 84 by a belt 81. The drive shaft 84 is rotatably mounted in bearing blocks 86 mounted to support member 88.

A motor 90 is advantageously mounted on the support member 88 and powers the drive shaft 84 in any conventional manner.

An endless belt conveyor 174 is mounted adjacent shaft end 70 of the rolls 60 and an endless belt conveyor 176 is mounted adjacent shaft end 148 of the rolls 100–112 as shown in FIG. 3. Each of the belt conveyors 174 and 176 are identical in construction and include an idler spool 178 and powered spool 180.

With reference to FIG. 4, the spools of the belt conveyor 174 are rotatably mounted on leg 182 of a steel C channel 184. The other leg 186 of the channel is secured to the structural member 74 (shown for spool 178 in FIG. 4). The spools 178 and 180 of the belt conveyor 174 are on a center to center spacing of about 3 feet (0.9 meter).

With reference to FIG. 5, the spools 178 and 180 of the belt conveyor 176 are similarly mounted on steel C channels 190 having end 192 secured to step down section 158 of the structural member 74. The spools 178 and 180 of the belt conveyor 176 are on a center to center spacing of about 7 feet (2.1 meters).

A pair of L-shaped guideways 198 each have one end secured to the surface 182 of the channel 184 of the belt conveyor 174. Similarly a pair of guideways 198 are mounted between the spools 178 and 180 of the belt conveyor 176.

An endless belt 194 having a width of about 1½ inches (3.80 centimeters) is mounted on the spools 178, 180 and guideway 198 of the belt conveyor 176. Similarly an endless belt 196 about 1½ inches (3.80 centimeters) wide is mounted on the spools 178, 180 and guideways 198 of the belt conveyor 174.

The spools 178 and 180 and respective C channels 184 and 190 are sized scuh that the belt is about 1 inch (2.54 centimeters) below and above the adjacent rolls 62 and 100–112.

A motor 200 powers the spool 180 of the belt conveyor 174 in any conventional manner to rotate the belt 196 at a rotational speed of about 60 feet/minute (18 meters/minute). A motor 202 powers the spool 180 of the belt conveyor 176 in any conventional manner to rotate the belt 194 at a rotational speed of about 52.5 feet/minute (16 meters/minute).

With reference to FIG. 2, the motor 90 rotates the shafts 140 of the rolls 100–112 and shafts 66 of the rolls 60 at about 57 revolutions per minute (RPM's). The peripheral rotational speed of the rolls 62 is about 720 inches/minute (18 meters/minute). The peripheral rotational speed of roll 100 is about 709 inches/minute (17.9 meters/minute) and each successive roll along the sheet movement path has an incremental increase of about 11.25 inches/minute (4 centimeters/minute).

Referring now to FIG. 1, the piece of glass 22 is advanced by conveyor 26 through a scoring station 30 to impose 2 lateral scores 32 spaced about 1 foot (0.3 meter) apart in the glass piece 22. The scored glass piece 22 moves into corner table 34 and thereafter advanced in the direction of the arrow 36 through a scoring station 37 to impose 2 longitudinal scores 38 spaced about 1 foot (0.3 meter) apart.

Conveyor 40 advances the scored sheet 22 through a longitudinal score opening station 42 to open the longitudinal scores 38 and thereafter through a lateral score opening station 46 to open the lateral scores 32 to provide 9 glass sheets 24.

Groups of 3 sheets 24 are removed from the lateral score opening station 46 and positioned on the conveyor section 94 of the separating and aligning conveyor 50 by pick up device 47. As the sheets 24 advance along the conveyor section 94, the sheets are separated and displaced toward the belt conveyor 176. As the sheets 24 move into engagement with the belt 194 of the belt conveyor 176, the sheets are aligned.

The sheets 24 are thereafter moved into the conveyor section 60 which maintains the alignment of the sheets by the belt conveyor 174. Since the peripheral speed of each roll 62 is equal the spaced distance between the sheets is maintained.

As individual sheets move into the downstream end of the conveyor section 60, they are removed by unloading device 54.

As can now be appreciated, the above example is presented to illustrate the invention and the invention is not limited thereto.

What is claimed is:

1. An apparatus for cutting a glass plate into glass sheets wherein the apparatus is of the type having glass scoring means, first means for conveying the glass plate past the scoring means to score the glass plate; means for opening the scores in the scored plate; second means for conveying the scored glass plate past the snapping means to sever the glass plate into glass sheets, glass sheet unloading station, and third means for conveying the glass sheets along a sheet movement path into the unloading station, the improvement comprising:

the third conveying means comprising:
a first plurality of spaced circular conveying members each having a different diameter;
means for rotating each of said first plurality of conveying members at the same axial rotational speed wherein each of said first plurality of conveying members has a different peripheral rotational speed to alter the spacing between the sheets as they move along the sheet movement path.

2. The conveying system as set forth in claim 1 wherein each of said first plurality of circular conveying members comprises:
a shaft;
an elongated sleeve mounted on the shaft; and
said elongated sleeve on respective ones of the shaft having increasing diameter in the direction of glass travel to increase the spaced distance between the sheets.

3. The conveying system as set forth in claim 2 further including:
a second plurality of spaced circular members mounted downstream of said first plurality of circular members;
means for rotating said second plurality of spaced circular members at substantially the same axial rotational speed of said first plurality of circular members.

4. The conveying system as set forth in claim 3 wherein said second plurality of spaced members has substantially the same diameter as adjacent upstream one of said first plurality of circular members.

5. The conveying system as set forth in claim 2 further including:
means for skewing said first plurality of circular members upstream along the movement path such that the rotating axis of said first plurality of circular members are parallel to one another and subtend an oblique angle to a line normal and transverse to the sheet movement path to move the sheets toward an end of said first plurality of circular members;
first endless belt;
means for mounting said first belt adjacent the end of said plurality of circular members, said belt means having a circular path normal and parallel to the sheet movement path; and
means for rotating said first endless belt at a circular speed corresponding to the peripheral speed of a one of said first plurality of circular members.

6. The conveying system as set forth in claim 5 further including:
a second plurality of spaced circular members mounted downstream of said first plurality of circular members, each of said second plurality of spaced members having the same diameter;
means for rotating said second plurality of circular members at substantially the same axial rotational speed of said first plurality of circular members;
second endless belt;
means for mounting said second belt adjacent an end of said second plurality of circular members, said second belt aligned with said first belt and having a circular path normal and parallel to the sheet movement path; and
means for rotating said second belt at a circular speed corresponding to the peripheral speed of a one of said second circular members.

7. The conveying system as set forth in claim 6 wherein said second plurality of spaced members has substantially the same diameter as adjacent upstream one of said first plurality of circular members.

8. The conveying system as set forth in claim 7 wherein said mounting means of said first belt and said mounting means of said second belt each comprise:
a pair of spaced rotatably mounted guides; and
a rigid plate mounted between said pair of guides to prevent bowing of said belt when engaged by the sheets.

* * * * *